ZERO DETECTOR FOR A POSITIONING SYSTEM

Filed Aug. 26, 1960 3 Sheets-Sheet 1

INVENTOR.
BELA L. ROMVARI

ATTORNEY

Sept. 28, 1965 B. L. ROMVARI 3,209,338

ZERO DETECTOR FOR A POSITIONING SYSTEM

Filed Aug. 26, 1960 3 Sheets-Sheet 2

INVENTOR.
BELA L. ROMVARI

Edward M. Farrell

ATTORNEY

Sept. 28, 1965 B. L. ROMVARI 3,209,338

ZERO DETECTOR FOR A POSITIONING SYSTEM

Filed Aug. 26, 1960 3 Sheets-Sheet 3

INVENTOR.
BELA L. ROMVARI

Edward M. Farrell

ATTORNEY

United States Patent Office 3,209,338
Patented Sept. 28, 1965

3,209,338
ZERO DETECTOR FOR A POSITIONING SYSTEM
Bela L. Romvari, Philadelphia, Pa., assignor to Sperry Rand Corporation, New York, N.Y., a corporation of Delaware
Filed Aug. 26, 1960, Ser. No. 53,583
6 Claims. (Cl. 340—174.1)

This invention relates to a positioning system, and more particularly to a carriage positioning system for quickly positioning a magnetic head over a selected portion of a magnetic drum.

Mass storage systems involving magnetic drums are well known. In such systems, information may be magnetically stored on information tracks on the drum. A drum, for example, may include as many as 2,000 or more information tracks. The information track, in turn, may be divided into sectors. In some magnetic drums, the capacity may include as many as 12,000,000 or more characters.

In using such magnetic drums in a computer system, accurate selection of a particular track and sector is of prime importance. Also, the time required to select a particular address on the drum prior to a reading or writing operation should be kept to a minimum. The time required for a positioning system to move a carriage from one address to another should be minimized.

It is an object of this invention to provide an improved carriage positioning system.

It is a further object of this invention to provide an improved carriage positioning system in which the time required to select a particular address on a magnetic drum is minimized.

It is still a further object of this invention to provide a fast zero detector for low carrier frequency A.C. servos.

In accordance with the present invention, a servo mechanism is responsive to an error positioning voltage and a velocity voltage to move a magnetic head carriage. The error positioning voltage and the velocity voltage are combined, with the combined voltage being compared to a reference voltage. When the combined voltage drops below the reference voltage, the servo mechanism becomes inoperative. The amplitude of the reference voltage is predetermined so that the magnetic head carriage stops at a selected area and the magnetic head is finally positioned over a selected information stack.

Other objects and advantages of the present invention will be apparent and suggest themselves to those skilled in the art to which the present invention is related, from a reading of the following specifications and claims, in conjunction with the accompanying drawing, in which:

FIGURE 1 is a block diagram illustrating a carriage positioning system, in accordance with the present invention;

FIGURES 2*a* and 2*b* are curves illustrating the characteristics of various voltages relating to the present invention during a positioning operation;

Figure 1:
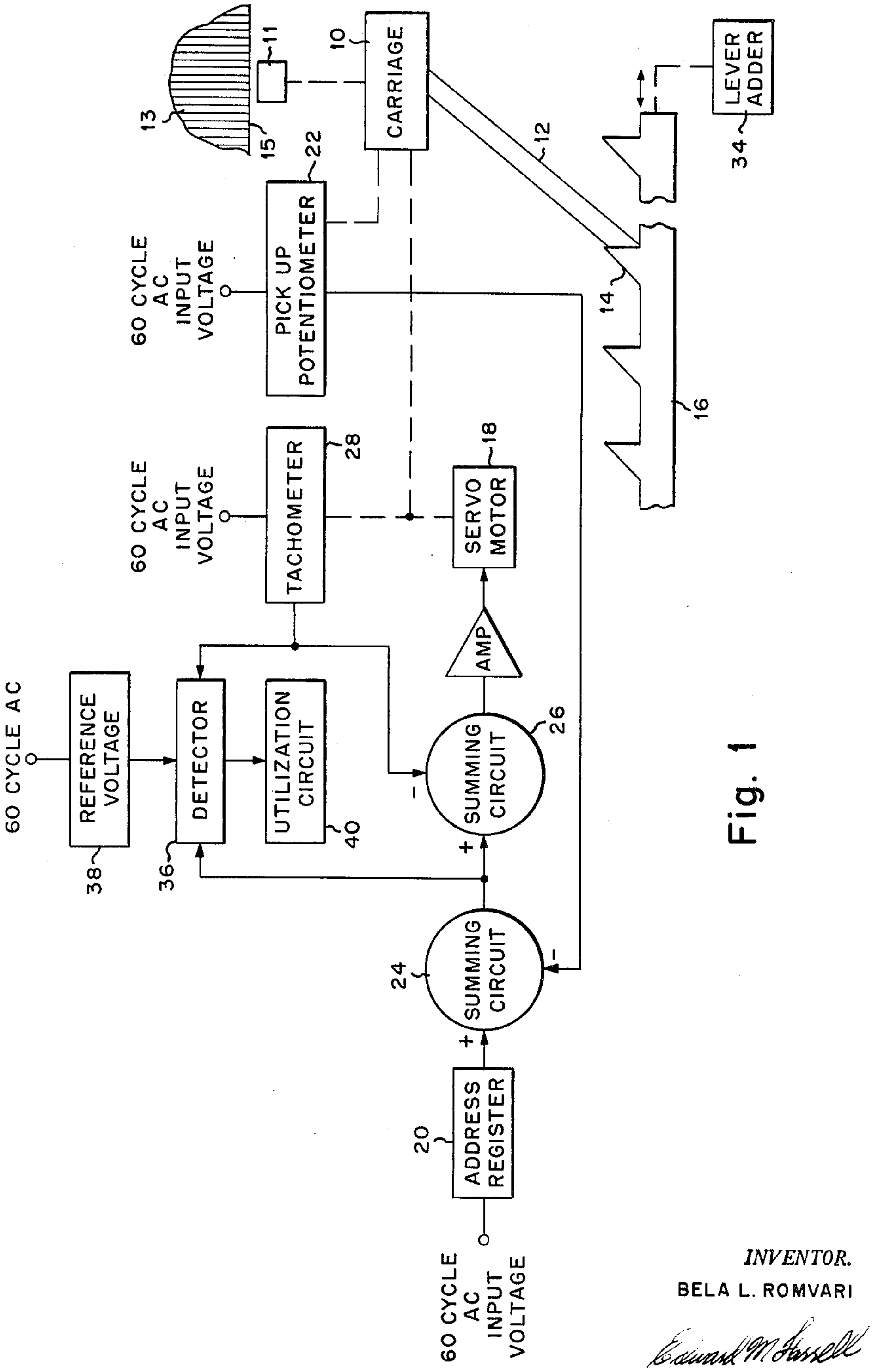

Referring particularly to FIGURE 1, a carriage 10 is adapted to be moved to a selected position in accordance with an applied address signal. The selected position may be one of a number of information tracks 13 on a magnetic drum 15 (partly illustrated). A pawl 12 is normally in a retracted position when the carriage 10 is being moved during a positioning operation. When the carriage 10 is close to its selected position, the pawl 12 is actuated and becomes extended to engage one of the teeth 14 of a positioning rack 16. The carriage 10 is driven by a servo motor 18, the speed of which is determined by the amplitude of the voltage applied thereto.

A system involving a pawl mechanism which may be employed with the present invention is described in a co-pending patent application of J. K. Brown, entitled "Protective Mechanism," Serial Number 20,057, filed April 5, 1960, now patent No. 3,077,245, and assigned to the same assignee as the present invention.

Let us consider the operation of the system when an address signal, representative of a position on a drum, is applied to an address register 20. The address signal may be a voltage derived from a binary coded signal, for example. A position pick-up potentiometer 22 is associated with the carriage 10 to produce a voltage, which is representative of the actual position of the carriage 10. The voltages from the address register 20 and position pick-up potentiometer 22 are applied to a summing circuit 24. The polarity of the address and potentiometer voltages are opposite in phase. The voltage from the summing circuit 24, equal to the difference between the voltage from the address register 20 and the potentiometer 22, may be considered as an error positioning voltage which corresponds to the actual position of the carriage 10 during a positioning operation and the position being sought by the carriage 10 during the positioning operation.

The error positioning voltage from the summing circuit 24 is applied to a second summing circuit 26. A damping voltage, representing the velocity of the servo motor 18 and consequently the carriage 10, is also applied to the summing circuit 26 from the tachometer 28. The tachometer 28 is associated with the servo motor 18 to generate a voltage representative of the speed of the servo motor. The output voltage from the summing circuit 26, equal to the difference between the positioning error and velocity voltages, is applied to the servo motor 18 to drive the carriage 10.

During a positioning operation as when the carriage 10 is moving closer to a desired information track on a magnetic drum, the voltage from the position pick-up potentiometer 22 continuously changes and approaches the voltage from the address register 20. The output voltage, representing a difference voltage, from the summing circuit 24 decreases as the carriage 10 moves closer to a selected track on the magnetic drum. When the voltage from the summing circuit 24 approaches zero, the servo motor 18 driving the carriage 10 becomes inoperative. At this point, a detector circuit 36 detects the zero condition, and may produce a pulse signal to actuate a utilization circuit 40. The utilization circuit 40 may include various circuits for controlling other operations in the computer system. A source of reference voltage 38 is also connected to the detector 36 for a reason to be described. The utilization circuit 40 may include a solenoid or the suitable means which is actuated to cause the pawl 12 to become extended and drop between two selected teeth 14 of the rack 16. The rack 16 is then moved to provide a fine positioning of the carriage.

A system describing a fine positioning of a rack is included in a co-pending patent application of H. F. Welsh, entitled "Lever Adder," Serial No. 10,374, filed February 23, 1960, now Patent Number 3,071,319, and assigned to the same assignee as the present invention.

Figures 2A, 2B:
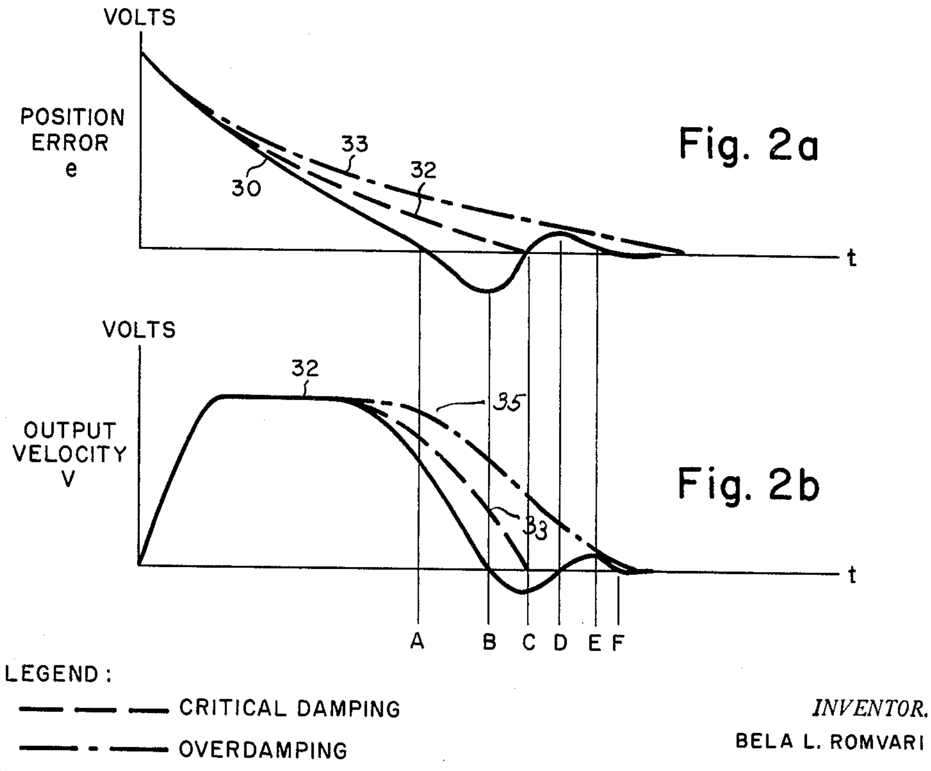

Referring particularly to FIGURE 2*a*, a curve 30 represents the error positioning voltage as the carriage 10 is being moved to a selected position. In FIGURE 2*b*, a curve 32 represents the velocity voltage, or damping voltage, from the tachometer 28 as the carriage 10 is being moved to a selected position.

In FIGURE 2*a*, when the carriage 10 approaches a selected address, the error voltage, represented by the curve 30, drops to zero at a time represented by the letter A. The velocity voltage at time A, represented by the curve 32 of FIGURE 2*b* does not reach zero until time B. Between times A and B, the error positioning and velocity voltages are opposite in phase. The combined voltage of these two voltages are applied to drive a servo motor during a carriage positioning operation. Due to the mechanical inertia of the system, a carriage cannot stop instantly upon reaching a selected position. Because the velocity voltage opposes the error positioning voltage and because of the polarity of the error positioning voltage, the direction of the carriage reverses direction and returns towards the selected address position. The error positioning voltage is again opposed to the velocity voltage. Left to itself, the process would repeat with each excursion of the carriage being reduced in amplitude by the electrical and mechanical damping of the carriage 10 until the combined voltage produced to drive a servo motor becomes too small to overcome the mechanical damping within the system.

In FIGURE 2*a*, the dashed line 32 represents the critical damping voltage and the dot-dash line 33 represents the position error voltage if over damping is used. Likewise in FIGURE 2*b*, the dashed line 33 represents critical damping and the dot-dash line 35 represents the output velocity if over damping is used.

The present invention is related to means for actuating a zero detector circuit which, in turn, controls means for shutting off the power to a servo motor at some point past B or D so that a carriage will coast in to a stop close to its selected position. When the various mechanical units and other factors within a system are considered, it is possible to determine a point at which to disconnect the servo motor driving circuits and to permit a carriage to safely coast into a selected postion.

Referring again to FIGURE 1, in a preferred embodiment of the present invention, it is necessary to extend or drop the pawl 12 between two selected teeth 14 of the rack 16. In order to accomplish this in a minimum amount of time, if due consideration is given to various factors within the system and the present invention is employed, the pawl 12 may be dropped while the carriage 10 is moving at a relatively low speed and is roughly close to its selected position. The timing of the dropping of the pawl 12 must be such that it will fall within an exact tooth area between two selected teeth 14 and not into an adjacent tooth area which would result in a false positioning of the carriage.

In a preferred embodiment of the present invention, the rack 16 is used for fine positioning of the carriage 10 after a rough positioning has been achieved. For example, the rough positioning of the carriage 10 may involve selection of the group of ten or more information tracks on a magnetic drum, with one group of such information tracks being equal in width to the area between two of the teeth 14. When the group of information tracks is first roughly selected, the rack 16 may be moved by a lever adder 34. The lever adder 34 is designed to move the rack 16 into any one of the 10 discrete positions, each position corresponding to one information track. The sequence of operation of the lever adder is not important and may be performed simultaneously with the rough positioning, dependent upon the particular system requirements.

The voltage from the summing circuit 24, representative of the error positioning voltage is applied to the zero voltage detector 36. The velocity voltage from the tachometer 28 is also applied to the detector 36. These two voltages are combined in the detector 36, with the combined voltage being compared to the reference voltage from a source 38. When the combined voltage drops resulting from the error positioning and velocity voltages drops below the level of the reference voltage, an output signal is developed by the detector 36 and applied to the utilization circuit 40. The detector 36 is more clearly illustrated in FIGURE 3, with particular circuit details being illustrated in FIGURE 5.

Figure 3:
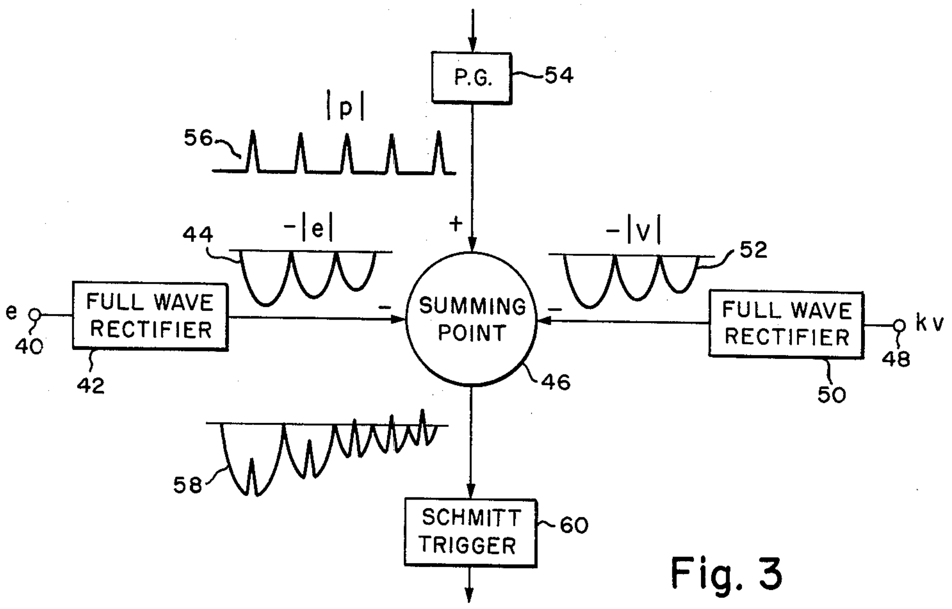
FIGURE 3 is a simplified block diagram illustrating in greater detail a portion of a carriage positioning system, such as illustrated in FIGURE 1, in accordance with the present invention.

Referring particularly to FIGURE 3, the voltage representative of the error positioning voltage is applied from a terminal 40 to a full way rectifier 42. The terminal 40 may be connected to the output circuit of the summing circuit 24 of FIGURE 1. The waveform 44 represents a rectified voltage from the full wave rectifier which is applied to a summing circuit 46, which may comprise part of the detector circuit 36 of FIGURE 1.

A voltage representing the velocity voltage, which may be from tachometer 38 of FIGURE 1 is applied from a terminal 48 to a full wave rectifier 40. A waveform 52 represents the rectified voltage from the rectifier 50 which is applied to the summing circuit 46.

A pulse generator circuit 54 produces a series of pulses, represented by the waveform 56, which is also applied to the summing circuit 46. The summing circuit 46 combines the three input voltages to produce an output voltage represented by a waveform 58.

The frequency of the velocity voltage from the tachometer 38, the error positioning voltage and the pulse generator circuit voltage is sixty cycles. The pulses from the pulse generator are phased so that their peaks coincide with the peaks of the velocity and error positioning voltages which are in phase with each other.

The pulses from the pulse generator 54 are of the opposite polarity to the combined voltage from the rectifiers 42 and 50. In the example given, the voltages from the rectifiers 42 and 50 are negative and the voltages from the pulse generator 54 are positive with respect to a common reference point within the system which may be designated as ground.

The output voltage from the summing circuit 46 is applied to a utilization circuit, which is illustrated as being a Schmitt trigger circuit 60. The Schmitt trigger circuit 60 is designed to change its operating states when a positive voltage is applied thereto. The waveform 58 illustrates the pulses 56 superimposed upon the combined voltage produced by the rectifiers 42 and 50. Because the pulses 56 are positive in polarity, they will trigger the Schmitt trigger circuit 60 before the combined voltage has fully been reduced to zero. It is seen that the Schmitt trigger circuit 60 may be made operative to change its state at a time which is dependent upon the amplitude of the pulses 56. In designing a system, the exact amplitude of the pulses 56 may involve various mechanical considerations to determine a safe point at which a pawl may be dropped accurately between two selected teeth. The output voltage from the Schmitt trigger circuit 60 may control the operation of a flip-flop, for example, to control various functions within a computer.

Figure 4:
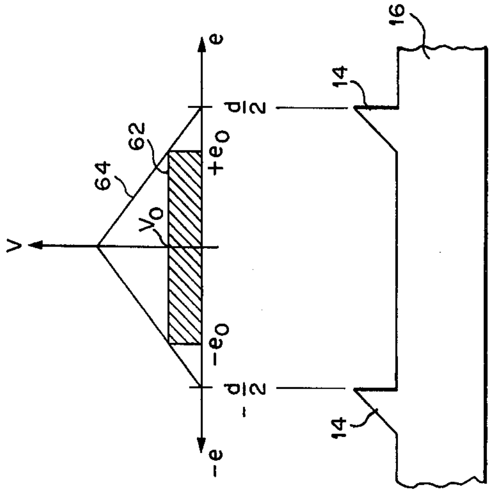
FIGURE 4 is a diagram presented for purposes of explanation in pointing out some of the features of the present invention.

Referring particularly to FIGURE 4, the positioning rack 16 having a pair of teeth 14 is illustrated in an enlarged view. For purposes of explanation, a diagrammatical view is shown directly above the rack between the areas of the pair of teeth 14. The velocity voltages have been illustrated in the diagram as being in one direction, it being understood that such voltages may actually be in two directions, with the direction being determined by the direction of the carriage movement.

The present invention is primarily directed to a comparison of a combined voltage with a reference voltage. When the reference voltage exceeds the amplitude of the combined voltage, a utilization circuit is actuated. The utilization circuit may include means for disconnecting various driving voltages from a servo motor together with means for actuating a circuit to cause a pawl mechanism to drop between two selected teeth of a positioning rack.

The rectangular area 62 is related to one method of accomplishing the present invention. The horizontal axis of the chart shown represents the error positioning voltage and may be in either of two directions. The error positioning voltage may be designated as $-e$ or $+e$. The vertical axis represents the velocity voltage and is indicated as $v$, and may also be plus or minus, although only the plus direction is illustrated.

It may be seen from an inspection of FIGURE 4 that a safe shut off point for the system, i.e. the point at which it is safe to disconnect the servo driving voltages and drop a pawl, may be determined by the value of the error positioning voltage $e$ together with the value of the velocity voltage $v$. It is seen that the error voltage should not exceed $|e_0|$ and the velocity voltage should not exceed $|v_0|$ to detect the condition or time at which it is safe to actuate the utilization circuit 40 (FIGURE 1). To achieve the above, that is to carry out the formula $|e|<e_0$ and $|v|<|v_0|$, would involve the use of two comparators and an AND circuit or other equipment to carry out similar functions.

In utilizing the teachings of the present invention, however, a combined error positioning voltage and velocity voltage may be compared with a reference voltage to determine the safe operating point at which to actuate a utilization circuit. This condition may be illustrated by the following formula: $|e|+|v|-P=0$.

The triangular area 64 represents the following logic: that the sum of the absolute values of the error and the velocity must not exceed a certain constant P to detect zero condition. That is, equation $|e|+|Kv|-|P|=0$ is the limit condition where K is a weighting constant. The second form or solution also permits the detection of the zero condition in cases when $|v|>|v_0|$, since $|e|<|e_0|$ exists through a relatively long period of the zero approach. In other words, the first system would not detect zero because of the velocity component $$(|v|>|v_0|)$$

and the servo would overshoot the selected tooth. Consequently time would be wasted while waiting until the servo came back to the selected tooth.

If the voltage controlling a servo mechanism is disconnected or made ineffective by the zero detector, the carriage will continue to move due to the mechanical inertia within the system. However, when the present invention is utilized, the system may be designed so that the velocity at which the carriage is moving is at a slow enough safe speed so that pawl, such as the pawl 12 of FIGURE 1, will become extended within the desired tooth area without resulting in damage to any of the moving parts. The point at which the servo mechanism voltages are disconnected or are otherwise made ineffective must be such that the pawl 12 is not permitted to fall within one of the adjacent tooth areas but must fall within the proper selected two teeth.

It is seen that in designing a system to determine a safe point to extend the pawl 12 that much time may be saved in finally positioning the carriage. For example, it is not necessary that the error positioning voltage pass through zero for several cycles before disconnecting the servo motor voltages.

In utilizing the present invention, the velocity and error positioning voltages must bear a relationship to the reference voltage. For example, various different mechanical positioning systems may require different reference voltage levels in determining a safe operating point to disconnect the servo motor voltages. Also, the width of the tooth areas between the teeth 14 may be different for different systems thereby changing the safe point to disconnect the servo motor voltages.

It is therefore seen that the velocity and error positioning voltages, together with the reference voltage, may be of various amplitudes and dependent largely upon the system with which they are employed. Accuracy in positioning and freedom from the likelihood of damage to the moving mechanical parts within the system are the prime considerations in determining the amplitude of the reference voltage which controls the point at which a servo mechanism becomes inoperative.

Figure 5:
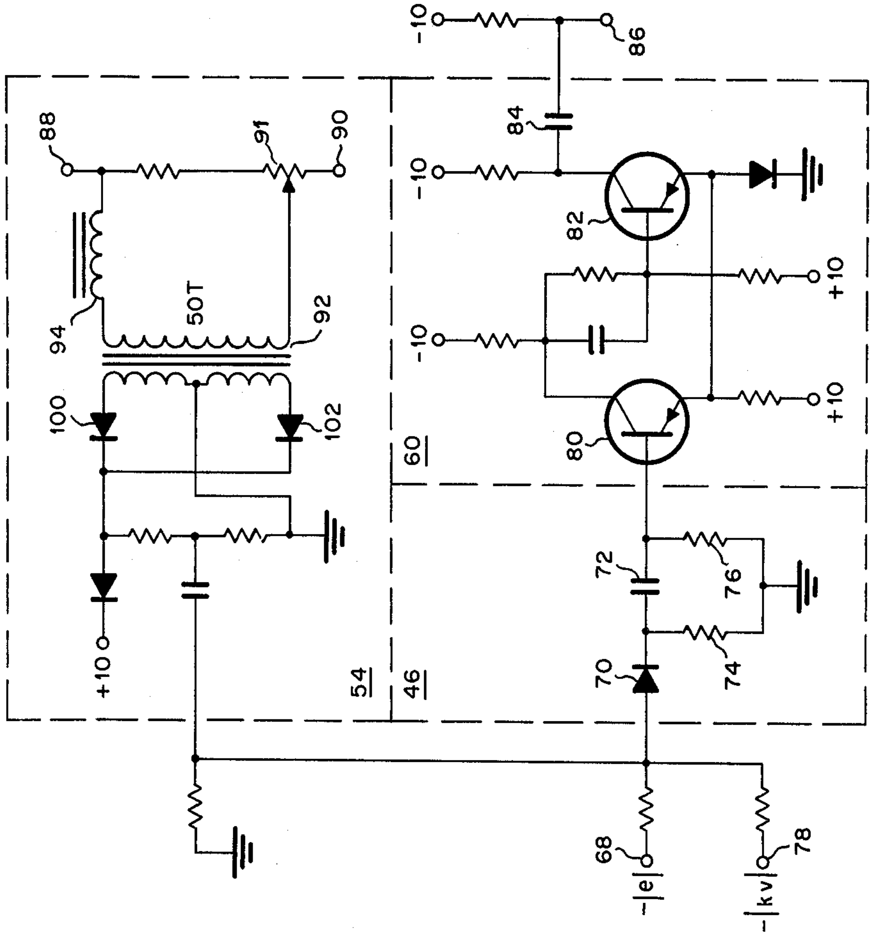
FIGURE 5 is a schematic circuit diagram illustrating in greater detail some of the main components illustrated in the block diagram of FIGURE 2.

Referring particularly to FIGURE 5, the absolute value of the error positioning voltage, represented by the waveform 44 (FIGURE 3) is applied through an input terminal 68 to the summing circuit 46. The summing circuit includes a diode 70, a capacitor 72, and resistors 74 and 76. The absolute value of the velocity voltage represented by the waveform 52 (FIGURE 3) is also applied to the summing circuit through an input terminal 78. The reference voltage, in a form of pulses 56 (FIGURE 3) is also applied to the summing circuit. The combined voltage, represented by the waveform 58 (FIGURE 3) is applied to the Schmitt trigger circuit 60. The summing circuit 46 combines the three applied voltages represented by the waveforms 44, 52 and 56.

The Schmitt trigger circuit 60 includes a pair of transistors 80 and 82. The transistors are biased so that the transistor 80 is normally conducting and the transistor 82 is normally non-conducting. When the voltage applied to the base of the transistor 80 becomes positive, as when one of the pulses 56 from the summing circuit 46 becomes positive, the operating states of the transistors 80 and 82 are switched with the transistor 80 becoming non-conducting and the transistor 82 becomes conducting.

When the transistor 82 switches from a non-conducting to a condutcing state, a signal is applied through a capacitor 84 to an output terminal 86. The output terminal 86 may be connected to control various operations within a positioning or computer system. One such operation may involve controlling a circuit to permit the pawl 12 (FIGURE 1) to become extended to thereby engage a positioning rack. The summing circuit 46, as well as the Schmitt trigger circuit 60, may be of various types other than those shown.

The pulse generator circuit 54 includes a pair of input terminals 88 and 90 to which an A.C. voltage is applied. The voltage at the terminal 88 and 90 is applied to the primary winding of a transformer 92 which acts as a form of differenentiator circuit. The current through the primary of the transformer 92 also passes through a saturable reactor 94. The saturable reactor 94 has the characteristic of permitting an applied signal to reach a peak level and then suddenly causing it to drop to zero. The precise phase of the pulses generated is controlled by a potentiometer 91.

The output voltage from the transformer 92, after differentiation, is in the form of a series of pulses, one for each half cycle of the carrier frequency. The output pulses from the transformer 92 is applied to a pair of diodes 100 and 102 to produce a series of pulses represented by the waveform 56 (FIGURE 1). The pulses represented by the waveform 56 are then applied to the summing circuit 46 in a manner previously described.

In practicing the invention, various other types of pulse generator circuits may be employed. Also the width of the pulses 56 is not critical, but the fgrequency is preferably related to the source frequency of the error positioning and velocity voltages. The frequency of the pulse generator may actually be twice the frequency of the error positioning velocity voltages.

It has been seen that the present invention has provided a means for greatly speeding up the final positioning of a carriage in a magnetic drum storage system. The zero detection rate is two per cycle of the servo carrier frequency. This is very desirable using servos of low carrier frequency. The speeding up has been accomplished without increasing the likelihood of damage to the moving mechanical parts in the system. While a specific embodiment has been illustrated and described, it is apparent that the broad concept involved in the present invention would find application in various other types of positioning systems where speed and safety are important.

What is claimed is:

1. A servo mechanism for driving a device to a selected position comprising a source of error voltage, a source of damping voltage, a source of reference voltage, means for combining said error and damping voltages to produce a combined voltage, means for applying said combined voltage to drive said servo mechanism, means for comparing said combined voltage with said reference voltage, a utilization circuit for controlling the operation of said servo mechanism, and means for actuating said utilization circuit when said combined voltage drops below said reference voltage.

2. A positioning system comprising a servo mechanism for driving a device, means for producing a direct current error voltage representative of the position of said carriage and the position being sought by said carriage during a positioning operation, means for producing a direct current velocity voltage representative of the velocity of said carriage during said positioning operation, said error and velocity voltages being of the same polarity, a source of reference voltage comprising a series of pulses of opposite polarity to the polarity of said error and velocity voltages, means for combining said error and velocity voltages to produce a combined voltage, means for applying said combined voltage to drive said servo mechanism, a control circuit normally in a first state to permit operation of said servo mechanism and in a second state to render said servo mechanism inoperative, means for applying said combined voltage and said series of pulses to said control circuit, said control circuit being responsive to operate in its first state when the amplitude of said combined voltage is greater than the amplitude of said series of pulses, and said control circuit switching to its second state when the amplitude of said series of pulses is greater than the amplitude of said combined voltage.

3. A positioning system as set forth in claim 2 wherein the operation of a rack engaging pawl is controlled by said control circuit wherein said pawl becomes extended to engage said rack when said control circuit switches to its second state.

4. A positioning system for positioning a magnetic head carried by a carriage to a selected information track of a magnetic drum comprising a servo mechanism for driving said carriage, means for producing a direct current error voltage representative of the position of said carriage and the position being sought by said carriage during a positioning operation, means for producing a direct current velocity voltage representative of the velocity of said carriage during said positioning operation, said error and velocity voltages being of the same polarity, a source of reference voltage comprising a series of pulses of opposite polarity to the polarity of said error and velocity voltages, means for combining said error and velocity voltages to produce a combined voltage, means for applying said combined voltage to drive said servo mechanism, a control circuit normally operative in a first state to permit operation of said servo mechanism and operative in a second state to render said servo mechanism inoperative, means for applying said combined voltage and said series of pulses to said control circuit, said control circuit being responsive to operate in its first state when the amplitude of said combined voltage is greater than the amplitude of said series of pulses, and said control circuit switching to its second state when the amplitude of said series of pulses is greater than the amplitude of said combined voltage.

5. A positioning system comprising a carriage, a magnetic head carried by said carriage, a magnetic drum including a plurality of information tracks, a servo mechanism for driving said carriage to a selected position to locate said magnetic head over a selected information track of said magnetic drum, means for producing a direct current error voltage representative of the position of said magnetic head and the location of the information track being sought by said magnetic head during a positioning operation, means for producing a direct current velocity voltage representative of the velocity of said carriage during said positioning operation, said error and velocity voltages being of the same polarity, a source of reference voltage comprising a series of pulses of opposite polarity to the polarity of said error and velocity voltages, means for combining said error and velocity voltages to produce a combined voltage, means for applying said combined voltage to drive said servo mechanism, a control circuit normally operative in a first state to permit operation of said servo mechanism and operative in a second state to render said servo mechanism inoperative, means for applying said combined voltage and said series of pulses to said control circuit, said control circuit being responsive to operate in its first state when the amplitude of said combined voltage is greater than the amplitude of said series of pulses, and said control circuit switching to its second state when the amplitude of said series of pulses is greater than the amplitude of said combined voltage.

6. In combination with a toothed positioning rack, a positioning system comprising a carriage, a magnetic head carried by said carriage, a pawl associated with said carriage and adapted to be in an extended or retracted position, a magnetic drum including a plurality of information tracks, a servo mechanism for driving said carriage to a selected position to locate said magnetic head over a selected information track of said magnetic drum, means for producing a direct current error voltage representative of the position of said magnetic head and the location of the information track being sought by said magnetic head during a positioning operation, means for producing a direct current velocity voltage representative of the velocity of said carriage during said positioning operation, said error and velocity voltages being of the same polarity, a source of reference voltage comprising a series of pulses of opposite polarity to the polarity of said error and velocity voltages, means for combining said error and velocity voltages to produce a combined voltage, means for applying said combined voltage to drive said servo mechanism, a control circuit normally operative in a first state to permit operation of said servo mechanism and to maintain said pawl in a retracted position, said control circuit being operative in a second state to render said servo mechanism inoperative and to cause said pawl to become extended to engage one of the teeth of said positioning rack, means for applying said combined voltage and said series of pulses to said control circuit, said control circuit being responsive to operate in its first state when the amplitude of said combined voltage is greater than the amplitude of said series of pulses, and said control circuit switching to its second state when the amplitude of said series of pulses is greater than the amplitude of said combined voltage.

References Cited by the Examiner

UNITED STATES PATENTS

| | | | |
|---|---|---|---|
| 2,733,425 | 1/56 | Williams et al. | 340—174.1 |
| 2,914,752 | 11/59 | MacDonald | 340—174.1 |
| 2,939,066 | 5/60 | Crenshaw | 318—448 |
| 2,965,828 | 12/60 | Wolman | 318—448 |
| 2,994,856 | 8/61 | Dickinson | 340—174.1 |
| 3,007,144 | 10/61 | Hagopian | 340—174.1 |

IRVING L. SRAGOW, *Primary Examiner.*

JOHN F. BURNS, *Examiner.*